(12) United States Patent
Schmalstieg

(10) Patent No.: US 9,269,003 B2
(45) Date of Patent: Feb. 23, 2016

(54) DIMINISHED AND MEDIATED REALITY EFFECTS FROM RECONSTRUCTION

(71) Applicant: QUALCOMM Incorporated, San Diego, CA (US)

(72) Inventor: Dieter Schmalstieg, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 14/225,157

(22) Filed: Mar. 25, 2014

(65) Prior Publication Data

US 2014/0321702 A1 Oct. 30, 2014

Related U.S. Application Data

(60) Provisional application No. 61/817,792, filed on Apr. 30, 2013.

(51) Int. Cl.
*G06K 9/00* (2006.01)
*G06T 7/20* (2006.01)
(Continued)

(52) U.S. Cl.
CPC .............. *G06K 9/00624* (2013.01); *G06T 7/20* (2013.01); *G06T 19/006* (2013.01)

(58) Field of Classification Search
USPC ......... 382/100, 103, 106–107, 140, 154, 162, 382/168, 173, 181, 199, 203, 209, 216, 219, 382/254, 266, 274, 276, 285–291, 305, 312, 382/321; 345/420, 473, 419; 455/556.1
See application file for complete search history.

(56) References Cited

U.S. PATENT DOCUMENTS

| | | | | |
|---|---|---|---|---|
| 7,168,953 B1* | 1/2007 | Poggio | ................. | G06T 13/205 345/473 |
| 8,175,413 B1* | 5/2012 | Ioffe | ..................... | G06K 9/20 382/100 |
| 2008/0212838 A1* | 9/2008 | Frigerio | ............... | G06K 9/209 382/107 |

(Continued)

FOREIGN PATENT DOCUMENTS

WO 2013006067 A1 1/2013

OTHER PUBLICATIONS

Bhat P., et al., "Using Photographs to Enhance Videos of a Static Scene", Rendering Techniques 2007: 18th Eurographics Symposium on Rendering, Grenoble. France. Jun. 25-27, 2007, Eurographics Association. Jun. 25, 2007, pp. 327-338, XP002691476, ISBN: 978-3-905673-52-4 abstract section 4: introductory section. sections 4.1. 4.2. 5.1.1, figure 2.

(Continued)

*Primary Examiner* — Seyed Azarian
(74) *Attorney, Agent, or Firm* — Silicon Valley Patent Group LLP

(57) ABSTRACT

Disclosed embodiments pertain to apparatus, systems, and methods for mixed reality. In some embodiments, a camera pose relative to a tracked object in a live image may be determined and used to render synthetic images from keyframes in a 3D model without the tracked object. Optical flow magnitudes for pixels in a first mask region relative to a subset of the synthetic images may be determined and the optical flow magnitudes may be used to determine pixels in each of the subset of synthetic images that correspond to pixels in the first mask. For each pixel in the first mask, a corresponding replacement pixel may be determined as a function of pixels in the subset of synthetic images that correspond to the corresponding pixel in the first mask.

28 Claims, 7 Drawing Sheets

(51) Int. Cl.
G06T 19/00 (2011.01)
G06T 15/00 (2011.01)

(56) References Cited

U.S. PATENT DOCUMENTS

| | | | |
|---|---|---|---|
| 2011/0102419 A1* | 5/2011 | Haanpaa | G06K 9/0063 345/419 |
| 2011/0143811 A1* | 6/2011 | Rodriguez | G06K 9/00986 455/556.1 |
| 2011/0267344 A1* | 11/2011 | Germann | G06K 9/00201 345/420 |
| 2012/0251995 A1 | 10/2012 | Ghyme et al. | |
| 2012/0269456 A1 | 10/2012 | Bekaert et al. | |
| 2012/0306876 A1 | 12/2012 | Shotton et al. | |
| 2013/0093788 A1 | 4/2013 | Liu et al. | |

OTHER PUBLICATIONS

Debevec P., et al., "Efficient view-dependent image-based rendering with projective texture-mapping", Rendering Techniques '98. Proceedings of 9th Eurographics Workshop on Rendering, Springer-Verlag, Austria, 1998. pp. 105-116,329, XP002644805, ISBN: 3-211-83213-0 abstract.

International Search Report and Written Opinion—PCT/US2014/031926—ISA/EPO—Aug. 26, 2014.

Matsushita Y., et al., "Full-Frame Video Stabilization", Proceedings / 2005 IEEE Computer Society Conference on Computer Vision and Pattern Recognition, CVPR 2005: [Jun. 20-25, 2005. San Diego, CA], IEEE, Piscataway, NJ, USA, vol. 1, Jun. 20, 2005. pp. 50-57, XP010817414, DOI: 10.1109/CVPR.2005.166 ISBN: 978-0-7695-2372-9 abstract section 2, figure 5.

Bastian J., et al., "Interactive Modelling for AR Applications," 2010 9th IEEE International Symposium on Mixed and Augmented Reality (ISMAR '10), Seoul, South Korea, Oct. 13-16, 2010, pp. 199-205.

Buehler C., et al., "Unstructured Lumigraph Rendering," Proceedings of the 28th annual conference on Computer graphics and interactive techniques (SIGGRAPH '01), New York, NY, USA, 2001, pp. 425-432.

Cosco F.I., et al., "Augmented Touch without Visual Obtrusion," Proceedings of the 2009 8th IEEE International Symposium on Mixed and Augmented Reality (ISMAR '09), Orlando, FL, USA, Oct. 19-22, 2009, pp. 99-102.

Eisemann M., et al., "Floating Textures," Computer Graphics Forum (Proceedings of Eurographics 2008), vol. 27, No. 2, Apr. 2008, pp. 409-418.

Herling J., et al., "PixMix: A Real-Time Approach to High-Quality Diminished Reality," IEEE International Symposium on Mixed and Augmented Reality 2012, Science and Technology Proceedings, Atlanta, GA, USA, Nov. 5-8, 2012, pp. 141-150.

Klein G., et al., "Parallel Tracking and Mapping for Small AR Workspaces," 6th IEEE and ACM International Symposium on Mixed and Augmented Reality, 2007, XP031269901, ISMAR 2007. pp. 225-234.

Newcombe, R. A., et al., "KinectFusion: Real-Time Dense Surface Mapping and Tracking," Proceedings of the 10th IEEE International Symposium on Mixed and Augmented Reality (ISMAR '11), 2011, pp. 127-136.

Newcombe, R.A.,et al., "DTAM: Dense Tracking and Mapping in Real-Time," IEEE International Conference on Computer Vission (ICCV), 2011, pp. 2320-2327.

Unger M., et al., "Joint Motion Estimation and Segmentation of Complex Scenes with Label Costs and Occlusion Modeling," 2012 IEEE Conference on Computer Vision and Pattern Recognition (CVPR '12), Providence, RI, USA, Jun. 16-21, 2012, pp. 1878-1885.

Zach C., et al., "A Duality Based Approach for Realtime TV-L1 Optical Flow," Proceedings of the 29th DAGM conference on Pattern recognition, 2007, pp. 214-223.

Lepetit V., et al., "An Intuitive Tool for Outlining Objects in Video Sequences: Applications to Augmented and Diminished Reality," in Proceedings of the second International Symposium on Mixed Reality, ISMR 2001, pp. 159-160.

Shahrokni A., et al., "Polyhedral Object Detection and Pose Estimation for Augmented Reality Applications," Proceeding of Computer Animation, IEEE Computer Society, 2002, pp. 65-69.

Zokai S., et al., "Multiview Paraperspective Projection Model for Diminished Reality," 2003, 10 pages.

* cited by examiner

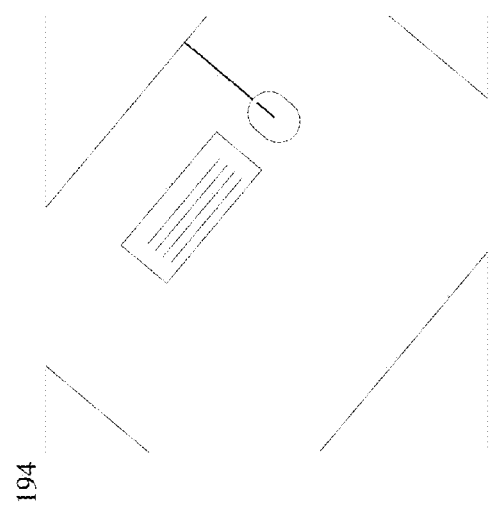
Fig. 2A
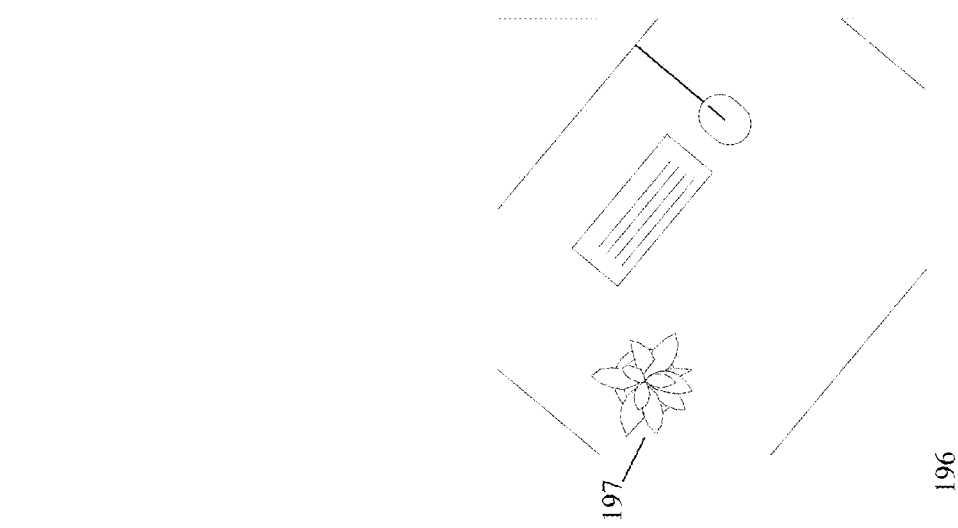
Fig. 2B
Fig. 2C

US 9,269,003 B2

DIMINISHED AND MEDIATED REALITY EFFECTS FROM RECONSTRUCTION

CROSS REFERENCE TO RELATED APPLICATIONS

This application claims the benefit of and priority to U.S. Provisional Application No. 61/817,792 entitled "Diminished and Mediated Reality Effects from Reconstruction" filed Apr. 30, 2013, which is incorporated by reference in its entirety herein.

FIELD

This disclosure relates generally to apparatus, systems, and methods for mixed reality.

BACKGROUND

In computer vision and computer graphics, 3-dimensional ("3D") reconstruction is the process of determining the shape and/or appearance of real objects and/or the environment. In general, the term 3D model is used herein to refer to a representation of a 3D environment being modeled by a device. 3D reconstruction may be based on data and/or images of an object obtained from various types of sensors including cameras. For example, a handheld camera may be used to acquire information about a small 3D scene and produce an approximate virtual model of the scene.

Augmented Reality (AR) and Mixed Reality (MR) applications are often used in conjunction with 3D reconstruction. In AR, real images may be processed to add virtual objects to the image. In Mixed Reality (MR) effects, such as Diminished Reality or Mediated Reality, may be implemented based on a 3D model of an existing scene to remove and/or alter objects in the images. In Diminished Reality, a real object is seamlessly removed from the scene, whereas, in Mediated Reality, a real object is seamlessly replaced by a virtual one. Conventional real-time or near real-time AR/MR methods often perform less than optimally because the methods may use inpainting techniques, where portions of the current image are copied over the object to be removed. Inpainting can cause artifacts, which may be exacerbated from a lack of accuracy and/or other errors in scene reconstruction and live camera tracking.

Therefore, there is a need for image processing methods to enhance the quality of rendered MR images to achieve a more optimal user experience.

SUMMARY

According to some aspects, methods are disclosed for mixed reality applications. In some embodiments, the method may comprise: obtaining a plurality of live images, the live images comprising a tracked object and determining, for a live image in the plurality of live images, a camera pose relative to the tracked object. A plurality of synthetic images without the tracked object may be rendered, where each synthetic image is obtained from a distinct keyframe in a 3D model based on the camera pose. The live and synthetic images may be compared to determine a first mask region associated with the tracked object and optical flow magnitudes may be computed for a plurality of pixels in a first mask region associated with the tracked object relative to a subset of synthetic images in the plurality of synthetic images. For each of the plurality of pixels in the first mask, a corresponding pixel in each of the subset of synthetic images may be determined based, in part, on the optical flow magnitude; and replacement pixels may be determined for each of the plurality of pixels in the first mask, where each replacement pixel corresponds to a distinct pixel in the first mask and each replacement pixel is determined as a function of the corresponding pixels in the subset of synthetic images that correspond to the pixel in the first mask.

In another aspect, a Mobile Station (MS) may comprise: a camera configured to capture a plurality of live images comprising a tracked object, a memory, the memory to store a 3D model comprising a plurality of keyframes, and a processor coupled to the camera and the memory. In some embodiments, the processor may be configured to: determine, for a live image in the plurality of live images, a camera pose relative to the tracked object; render a plurality of synthetic images without the tracked object, each synthetic image obtained from a distinct keyframe in a 3D model based on the camera pose; compare the live and synthetic images to determine a first mask region associated with the tracked object; compute optical flow magnitudes for a plurality of pixels in a first mask region associated with the tracked object relative to a subset of synthetic images in the plurality of synthetic images; determine, for each of the plurality of pixels in the first mask, a corresponding pixel in each of the subset of synthetic images based, in part, on the optical flow magnitude; and determine replacement pixels for each of the plurality of pixels in the first mask, each replacement pixel corresponding to a distinct pixel in the first mask, wherein each replacement pixel is determined as a function of the corresponding pixels in the subset of synthetic images that correspond to the pixel in the first mask.

In a further aspect, an apparatus may comprise: imaging means, the imaging means to capture a plurality of images comprising a tracked object, storage means, the storage means to store a 3D model comprising a plurality of keyframes, and processing means, the processing means coupled to the imaging means and the storage means. In some embodiments, the processing means may further comprise: means for determining, for a live image in the plurality of live images, a camera pose relative to the tracked object; means for rendering a plurality of synthetic images without the tracked object, each synthetic image obtained from a distinct keyframe in a 3D model based on the camera pose; means for compare the live and synthetic images to determine a first mask region associated with the tracked object; means for computing optical flow magnitudes for a plurality of pixels in a first mask region associated with the tracked object relative to a subset of synthetic images in the plurality of synthetic images; means for determining, for each of the plurality of pixels in the first mask, a corresponding pixel in each of the subset of synthetic images based, in part, on the optical flow magnitude; and means for determining replacement pixels for each of the plurality of pixels in the first mask, each replacement pixel corresponding to a distinct pixel in the first mask, wherein each replacement pixel is determined as a function of the corresponding pixels in the subset of synthetic images that correspond to the pixel in the first mask.

In another aspect, a computer-readable medium may comprise instructions, which, when executed by a processor, may perform steps in a method that may comprise: obtaining a plurality of live images, the live images comprising a tracked object; determining, for a live image in the plurality of live images, a camera pose relative to the tracked object; rendering, based on the camera pose, a plurality of synthetic images without the tracked object, each synthetic image obtained from a distinct keyframe in a 3D model based on the camera pose; comparing the live and synthetic images to determine a first mask region associated with the tracked object; computing optical flow magnitudes for a plurality of pixels in a first mask region associated with the tracked object relative to a subset of synthetic images in the plurality of synthetic images; determining, for each of the plurality of pixels in the first mask, a corresponding pixel in each of the subset of synthetic images based, in part, on the optical flow magnitude; and determining replacement pixels for each of the plurality of pixels in the first mask, each replacement pixel corresponding to a distinct pixel in the first mask, wherein each replacement pixel is determined as a function of the corresponding pixels in the subset of synthetic images that correspond to the pixel in the first mask.

Embodiments disclosed also relate to software, firmware, and program instructions created, stored, accessed, or modified by processors using computer readable media or computer-readable memory. The methods described may be performed on processors and various mobile devices.

These and other embodiments are further explained below with respect to the following figures. It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

Embodiments of the invention will be described, by way of example only, with reference to the drawings.

FIG. 2A shows an exemplary image 192, which may be processed by Mixed Reality applications.

FIG. 2B shows diminished reality image 194, where object 193 has been removed.

FIG. 2C shows mediated reality image 196, where object 193 has been replaced with virtual object 197.

DETAILED DESCRIPTION

Figure 1:
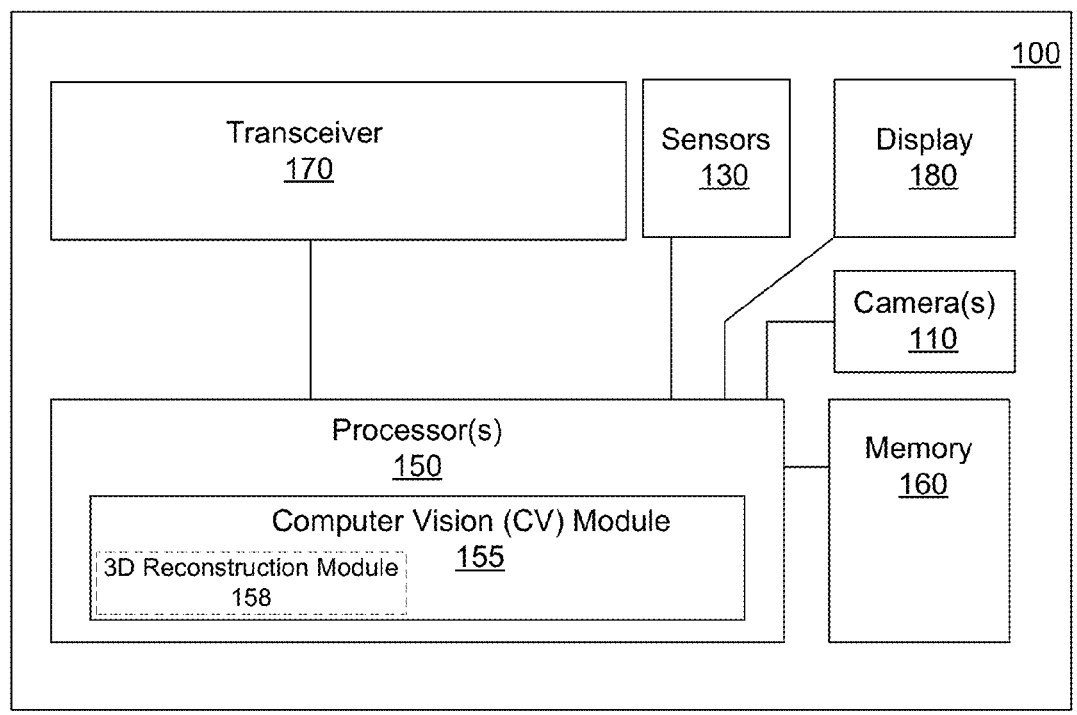
FIG. 1 shows a block diagram of an exemplary mobile device capable of implementing diminished and mediated reality effects in a manner consistent with disclosed embodiments.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

In conventional 3D reconstruction, which is computationally expensive, a set of digital images are typically processed off-line in batch mode along with other sensory information and a 3D model of an environment may be obtained, typically, after a long processing delay. Thus, practical real time applications that use 3D reconstruction have been hitherto limited.

More recently, conventional real-time or near real-time 3D reconstruction has gained traction due to the availability of increased processing power, advanced algorithms, as well as new forms of input data. Users may now obtain feedback on 3D reconstruction in near real-time as captured pictures are processed rapidly by computing devices, including mobile devices, thereby facilitating real-time or near real-time AR and/or MR applications.

AR/MR applications, which may be real-time interactive, typically combine real and virtual images and perform alignment between a captured image and an object in 3-D. Therefore, determining what objects are present in a real image as well as the location of those objects may facilitate effective operation of many AR and/or MR systems and may be used to aid virtual object placement, removal, occlusion and other effects.

In computer vision, detection refers to the process of localizing a target object in a captured image frame and computing a camera pose with respect to a frame of reference. Tracking refers to camera pose estimation over a temporal sequence of image frames.

Conventional near real-time techniques typically use inpainting techniques. Inpainting refers to the use of image interpolation techniques to replace pixels with background or virtual pixels. Conventional inpainting techniques suffer from a lack of accuracy during scene reconstruction, which is compounded by errors from live camera tracking. Thus, inpainting techniques, when used in conjunction with AR/MR applications, often yield sub-par user experiences. The lack of accuracy may result in a degradation of rendering quality and in various image artifacts, such as ghosting and blurring, which detract from the AR/MR experience. Therefore, some embodiments disclosed herein apply computer vision and image processing techniques to improve reconstruction and tracking accuracy thereby enhancing user AR/MR experience.

These and other embodiments are further explained below with respect to the following figures. It is understood that other aspects will become readily apparent to those skilled in the art from the following detailed description, wherein it is shown and described various aspects by way of illustration. The drawings and detailed description are to be regarded as illustrative in nature and not as restrictive.

FIG. 1 shows a block diagram of an exemplary mobile device or Mobile Station (MS) 100 capable of implementing computer vision applications, including diminished and mediated reality effects in a manner consistent with disclosed embodiments. In some embodiments, MS 100 may be capable of implementing MR methods such as Mediated Reality based on an existing model of a 3D environment. In some embodiments, the MR methods may be implemented in real time or near real time in a manner consistent with disclosed embodiments.

As used herein, mobile device or mobile station (MS) 100, may take the form of a cellular phone, mobile phone, or other wireless communication device, a personal communication system (PCS) device, personal navigation device (PND), Personal Information Manager (PIM), or a Personal Digital Assistant (PDA), a laptop, tablet, notebook and/or handheld computer. The terms mobile device or mobile station are used interchangeably herein. In some embodiments, MS 100 may be capable of receiving wireless communication and/or navigation signals.

Further, the term "mobile station" is also intended to include devices which communicate with a personal navigation device (PND), such as by short-range wireless, infrared, wireline connection, or other connections and/or position-related processing occurs at the device or at the PND. Also, "mobile station" is intended to include all devices, including various wireless communication devices, which are capable of communication with a server (such as server 600 in FIG. 6), regardless of whether wireless signal reception, assistance data reception, and/or related processing occurs at the device, at a server, or at another device associated with the network. Any operable combination of the above are also considered a "mobile station."

The term "mobile station" is also intended to include gaming or other devices that may not be configured to connect to a network or to otherwise communicate, either wirelessly or over a wired connection, with another device. For example, a "mobile station" may omit communication elements and/or networking functionality. For example, embodiments described herein may be implemented in a standalone device that is not configured to connect for wired or wireless networking with another device.

As shown in FIG. 1, MS 100 may include cameras 110, sensor bank or sensors 130, processors 150, memory 160, display 180 and/or transceiver 170, which may be operatively coupled to each other and to other functional units (not shown) on MS 100. For example, cameras 110, processors 150, memory 160, display 180, transceiver 170 and/or other functional units may be operatively coupled through buses, lines, fibers, links, etc., or some combination thereof.

Transceiver 170 may, for example, include a transmitter enabled to transmit one or more signals over one or more types of wireless communication networks and a receiver to receive one or more signals transmitted over the one or more types of wireless communication networks. Transceiver 170 may permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANs) such Bluetooth, Near Field Communication (NFC), networks based on the IEEE 802.15x family of standards, etc, and/or Wireless Wide Area Networks (WWANs) such as LTE, WiMAX, etc. In some embodiments, transceiver 170 may be capable of receiving signals from Global Navigation Satellite Systems (GNSS), which may be used for determining the position of MS 100. Mobile device may also include one or more ports for communicating over wired networks. In some embodiments, the transceiver 170 and/or one or more other ports on mobile device 100 may be omitted.

In some embodiments, MS 100 may comprise image sensors such as CCD or CMOS sensors and/or cameras 110, which are hereinafter referred to as "cameras 110". Cameras 110 may convert an optical image into an electronic or digital image and may send captured images to processor 150. In some embodiments, cameras 110 may be housed in a wearable display, which may be operationally coupled to, but housed separately from, processors 150 and/or other functional units in MS 100.

In some embodiments, cameras 110 may include multiple cameras, front and/or rear-facing cameras, wide-angle cameras, high resolution cameras, and may also incorporate CCD, CMOS, and/or other sensors. Camera(s) 110, which may be still and/or video cameras, may capture a series of still and/or video image frames of an environment and send the captured image frames to processor 150. In some embodiments, camera 110 may be a wearable camera, or an external camera, which may be operationally coupled to, but housed separately from, other functional units in MS 100. In one embodiment, images captured by cameras 110 may be in a raw uncompressed format and may be compressed prior to being processed and/or stored in memory 160. In some embodiments, image compression may be performed by processors 150 using lossless or lossy compression techniques. In some embodiments, cameras 110 may be stereoscopic cameras capable of capturing 3D images. In another embodiment, camera 110 may include depth sensors that are capable of estimating depth information.

Processors 150 may also execute software to process image frames captured by camera 110. For example, processor 150 may be capable of processing one or more image frames received from camera 110 to determine the pose of camera 110, implementing various computer vision and image processing algorithms, running AR/MR applications and/or performing 3D reconstruction of an environment corresponding to an image received from camera(s) 110. The pose of camera 110 refers to the position and orientation of the camera 110 relative to a frame of reference. In some embodiments, camera pose may be determined for 6-Degrees Of Freedom (6 DOF), which refers to three translation components (which may be given by X,Y,Z coordinates of a frame of reference) and three angular components (e.g. roll, pitch and yaw relative to the same frame of reference).

In some embodiments, the pose of camera 110 and/or MS 100 may be determined and/or tracked by processor 150 using a visual tracking solution based on image frames received from camera 110. In some embodiments, Computer Vision (CV) Module 155 may be implemented using dedicated circuitry, such as Application Specific Integrated Circuits (ASICs), Digital Signal Processors (DSPs), and/or dedicated processor (such as processor 150). In some embodiments, CV module 155 may include functionality to communicate with one or more other processors on MS 100. In some embodiments, CV module 155 may implement various computer vision and/or image processing methods such as 3D reconstruction, AR/MR, image compression and filtering. CV module 155 may also implement computer vision based tracking, model-based tracking, Simultaneous Localization And Mapping (SLAM), etc. In some embodiments, the methods implemented by CV module 155 may be based on camera captured color or grayscale image data, which may be used to generate estimates of 6 DOF pose measurements of the camera.

SLAM refers to a class of techniques where a map of an environment, such as a map of an environment being modeled by MS 100, is created while simultaneously tracking the pose of MS 100 relative to that map. SLAM techniques include Visual SLAM (VLSAM), where images captured by a single camera, such as camera 110 on MS 100, may be used to create a map of an environment while simultaneously tracking the camera's pose relative to that map. VSLAM may thus involve tracking the 6 DOF pose of a camera while also determining the 3-D structure of the surrounding environment. For example, in some embodiment, VSLAM techniques may detect salient feature patches in one or more captured image frames and store the captured imaged frames as keyframes or reference frames. In keyframe based SLAM, the pose of the camera may then be determined, for example, by comparing a currently captured image frame with one or more keyframes.

In some embodiments, CV module 155 may comprise 3D reconstruction module 158, which may use the camera pose and per-pixel map information to create a 3D model or representation of the environment. In some embodiments, 3D reconstruction module 158 may be implemented using dedicated circuitry, such as Application Specific Integrated Circuits (ASICs), Digital Signal Processors (DSPs), and/or dedicated processor (such as processor 150). In one embodiment, processor 150 may track the position of camera 110 by using monocular VSLAM techniques to build a coarse map of the environment around MS 100 for accurate and robust 6 DOF tracking of camera 110. The term monocular refers to the use of a single non-stereoscopic camera to capture images or to images captured without depth information.

In some embodiments, the 3D model may take the form of a textured 3D mesh, a volumetric data set, a CAD model etc., which may be used to render the 3D environment being modeled. For example, in embodiments where a 3D mesh is used, keyframes in a VSLAM technique may be used to acquire a sparse point cloud representation of an environment. The term sparse point cloud refers to a set of scattered data points in a coordinate system, such as, for example a 3D coordinate system with X, Y, and Z coordinates. The point cloud representation may then be converted into a 3D mesh using an appropriate scattered data interpolation method.

In some embodiments, processors 150 may also receive input from Sensors 130, which may include a variety of other sensors, such as an ambient light sensor, acoustic sensors, an Inertial Measurement Unit (IMU) etc. The IMU, which may comprise 3-axis accelerometer(s), 3-axis gyroscope(s), and/or magnetometer(s), may provide velocity, orientation, and/or other position related information to processor 150. In some embodiments, IMU may output measured information in synchronization with the capture of each image frame by cameras 110. In some embodiments, the output of IMU may be used in part by processor 150 to determine a pose of camera 110 and/or MS 100.

Processors 150 may be implemented using a combination of hardware, firmware, and software. Processors 150 may represent one or more circuits configurable to perform at least a portion of a computing procedure or process related to 3D reconstruction, SLAM, tracking, modeling, image processing etc and may retrieve instructions and/or data from memory 160. Processors 150 may be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

Memory 160 may be implemented within processors 150 and/or external to processors 150. As used herein the term "memory" refers to any type of long term, short term, volatile, nonvolatile, or other memory and is not to be limited to any particular type of memory or number of memories, or type of physical media upon which memory is stored. In some embodiments, memory 160 may hold program code that facilitates image processing, SLAM, tracking, modeling, 3D reconstruction, AR/MR applications, and other tasks performed by CV module 155 on processor 150. For example, memory 160 may hold data, captured still images, depth information, video frames, program results, 3D models, keyframes, as well as data provided by various sensors. In general, memory 160 may represent any data storage mechanism. Memory 160 may include, for example, a primary memory and/or a secondary memory. Primary memory may include, for example, a random access memory, read only memory, etc. While illustrated in FIG. 1 as being separate from processors 150, it should be understood that all or part of a primary memory may be provided within or otherwise co-located and/or coupled to processors 150.

Secondary memory may include, for example, the same or a similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory may be operatively receptive of, or otherwise configurable to couple to a non-transitory computer-readable medium in a removable media drive (not shown) coupled to mobile device 100. In some embodiments, non-transitory computer readable medium may form part of memory 160 and/or processor 150.

Further, MS 100 may include a screen or display 180 capable of rendering color images, including 3D images. In some embodiments, display 180 may be used to display live images captured by camera 110, AR images, Graphical User Interfaces (GUIs), program output, etc. In some embodiments, display 180 may comprise and/or be housed with a touchscreen to permit users to input data via some combination of virtual keyboards, icons, menus, or other Graphical User Interfaces (GUIs), user gestures and/or input devices such as a stylus and other writing implements. In some embodiments, display 180 may be implemented using a Liquid Crystal Display (LCD) display or a Light Emitting Diode (LED) display, such as an Organic LED (OLED) display. In other embodiments, display 180 may be a wearable display, which may be operationally coupled to, but housed separately from, other functional units in MS 100. In some embodiments, MS 100 may comprise ports to permit the display of the MR images through a separate monitor coupled to MS 100.

Not all modules comprised in mobile device 100 have been shown in FIG. 1. Exemplary mobile device 100 may also be modified in various ways in a manner consistent with the disclosure, such as, by adding, combining, or omitting one or more of the functional blocks shown. For example, in some configurations, mobile device 100 may not include transceiver 170. In one embodiment, MS 100 may take the form of a gaming or other devices that may not be configured to connect to a network or otherwise communicate, either wirelessly or over a wired connection, with another device. Thus, embodiments disclosed herein may be used in a standalone AR system/device, for example, in a mobile station that does not require communication with another device.

Further, in certain example implementations, mobile device 100 may include an IMU, which may comprise 3-axis gyroscope(s), and/or magnetometer(s). IMU may provide velocity, orientation, and/or other position related information to processor 150. In some embodiments, IMU may output measured information in synchronization with the capture of each image frame by cameras 110. In some embodiments, the output of IMU 130 may be used in part by processor 150 to determine a pose of camera 110 and/or MS 100. In some embodiments, the output of IMU may be used to determine, correct, and/or otherwise adjust the estimated pose. Further, in some embodiments, images received from camera(s) 110 may also be used to recalibrate or perform bias adjustments for the IMU. In some embodiments, MS 100 may comprise a positioning system, which may use GNSS and/or wireless (e.g. terrestrial positioning signals, Wi-Fi, WWAN, WPAN) signals, to determine location information for MS 100. In some embodiments, MS 100 may comprise a variety of other sensors such as ambient light sensors, microphones, acoustic sensors, ultrasonic sensors, laser range finders, etc. In some embodiments, portions of mobile device 100 may take the form of one or more chipsets, and/or the like.

FIG. 2A shows an exemplary image 192, which may be processed by Mixed Reality applications. In some embodiments, MS 100 may be capable of performing MR such as diminished reality, where a real object is seamlessly removed from a captured image. For example, as shown in FIG. 2B, in diminished reality image 194, object 193—a stack of books in image 192—has been removed from the image 194.

In some embodiments, MS 100 may be capable of performing MR such as mediated reality, where a real object may seamlessly replaced by a virtual one. For example, as shown in FIG. 2C, in mediated reality image 196, object 193—a stack of books in image 192—has been replaced virtual potted plant object 197 in image 196.

As another example, in one exemplary method of implementing mediated reality, an existing sofa may be removed from an image of a user's living room (diminished reality) and replaced with a sofa that the user may intend purchasing (mediated reality).

In some embodiments, MR may be performed using an existing 3D model of an environment. In some embodiments, keyframe based SLAM techniques such as Parallel Tracking And Mapping (PTAM) may be used by processors 150 on MS 100 to process images received from camera 110 and obtain a 3D model of an environment. Various well-known techniques may be used to obtain a 3D model of an environment. In some embodiments, a pre-existing and/or offline 3D model of an environment may be used and/or updated. In some embodiments, various interactive 3D reconstruction methods, such as keyframe based SLAM, may be used to obtain a 3D model of the environment.

As another mediated reality example, a toy action figure placed on a surface may be replaced by an animated virtual action figure. In some embodiments, the toy action figure may be removed virtually from the image (diminished reality) prior to being replaced by the virtual action figure (mediated reality). Because the real toy action figure has first been removed from the image, the virtual action figure that replaces the real one may be moved arbitrarily in the image following removal based on the 3D model. Thus, embodiments disclosed herein obviate the use of pixel-by-pixel "over-painting" or "inpainting" of real objects when implementing mediated reality.

In some embodiments, by obtaining a 3D model of the background without the foreground, a virtual rendering of the background can be processed in conjunction with the rendering of the foreground. In the example above, the real toy action figure may be considered the foreground, and the remainder of the image as the background. Accordingly, for the example above, by obtaining a 3D model of the background without the real toy action figure, the background may be used to replace the foreground pixels. Then, the virtual toy action figure can be seamlessly animated and rendered in the diminished reality image.

In some embodiments, by reconstructing a 3D background, several MR effects may be implemented by MS 100 in real time and may be viewed on a display coupled to MS 100. For example, a known real object or foreground object may be removed from an image (diminished reality). Methods disclosed herein may be applied when the known real object is absent during reconstruction and/or when the foreground object is present during reconstruction. In some embodiments, methods disclosed herein may also facilitate removal of previously unknown objects, which were not present during reconstruction. For example, a user's hands and/or other undesired artifacts may be removed from an image. In some embodiments, the methods disclosed may facilitate precise real-time occlusion effects between virtual and real objects.

Figure 3A:
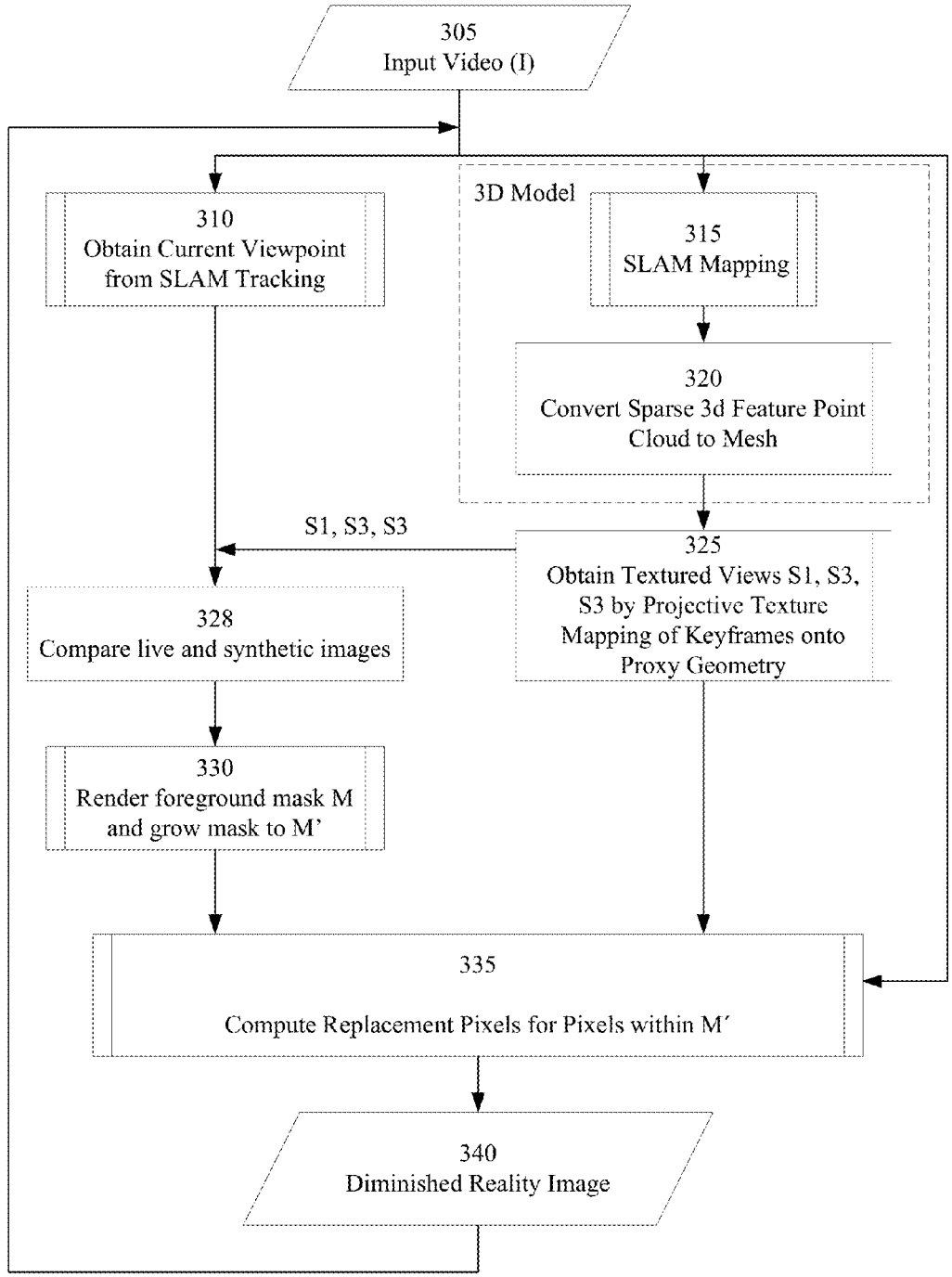
FIG. 3A shows a flowchart for an exemplary method for facilitating MR effects such as diminished and mediated reality effects from reconstruction in a manner consistent with disclosed embodiments.

FIG. 3A shows a flowchart for an exemplary method 300 for facilitating MR effects such as diminished and mediated reality effects from reconstruction using. In some embodiments, method 300 may be performed by processor 150 on MS 100 using image frames captured by camera(s) 110 and/or stored in memory 160. In some embodiments, method 300 may be performed by processors 150 in conjunction with one or more other functional units. In some embodiments, method 300 may be performed by CV module 155.

In some embodiments, live input video image frames 305 may comprise a sequence of image frames. In some embodiments, in step 315, a 3D model of the environment may be obtained.

For example, in some embodiments, a 3D model may be generated using any offline reconstruction method or through manual 3D modeling. In some embodiments, a 3D model such as, for example, a CAD model of the environment may be available and obtained from a server (such as server 600 in FIG. 6) coupled to MS 100. A 3D model may include information pertaining to the size and shape of an object, color and appearance information pertaining to the object, and textures that may be applied to the surface of the object.

Alternatively, in some embodiments, various interactive 3D reconstruction methods may be used to obtain the 3D model. In some embodiments, keyframe based Simultaneous Localization and Mapping (SLAM) may be used to obtain a 3D model of the environment. In some embodiments, the 3D model may not include the known tracked object. For example, one or more foreground objects may not be included in the 3D model.

SLAM based techniques permit the generation of maps of an unknown environment while simultaneously localizing the position of camera 110 and/or MS 110. In SLAM, images obtained by a camera (such as camera(s) 110) may be used to model an unknown environment with relatively low computational overhead thereby facilitating real-time and/or near real time modeling.

In keyframe based SLAM, a set of keyframes, which may be snapshots or image frames captured by camera 110 at various points in time, may be used to generate a map or model of the environment. In some embodiments, each keyframe may be associated with a camera-centered coordinate frame, and may comprise a pyramid of images of different resolutions. For example, a captured image keyframe may be subsampled to obtain images of differing resolutions that are associated with the keyframe.

Further, each feature point in the keyframe may be associated with: (i) its source keyframe, (ii) one of the subsampled images associated with the source keyframe and (iii) a pixel location within the subsampled image. Each feature point may also be associated with a patch, which refers to a portion of the (subsampled) image corresponding to a region, which may take the form of a polygon, around a feature point in the (subsampled) image. In some embodiments, in step 315 keyframe based SLAM may be used to process input video image frames 305 and acquire sparse 3D feature points and obtain a sparse point-cloud reconstruction of a scene. In some embodiments, SLAM Mapping updates, in step 315, may be performed periodically.

In step 310, an image frame in live input video image frames 305 may be processed to obtain a current camera viewpoint or camera pose for the image frame. In some embodiments, SLAM Tracking may be used to obtain the current viewpoint. For example, in one embodiment, keyframe based SLAM may be used for tracking, if it has been used previously for reconstruction. In some embodiments, one or more known objects that are to be removed (e.g. in a Diminished Reality application) from live input video image frames 305 may also be tracked. Tracking refers to camera pose estimation over a temporal sequence of image frames. Camera pose refers to the position and alignment of the camera relative to a frame of reference.

In some embodiments, steps 310 and 315 may be performed in parallel using multiple processors 150 on MS 100, different processor cores on the same processor 150, and/or by different process threads on processor(s) 150. In some embodiments, the pose of camera 110 may be tracked for every incoming image frame in step 310, while SLAM Mapping updates, in step 315, may be performed periodically.

In step 320, the sparse 3D point cloud input from SLAM mapping step 315 may be converted into a 3D mesh. In some embodiments, a scattered data interpolation method may be used to convert the sparse point cloud into a mesh. Given a set of scattered points and a set of values for those points, scattered data interpolation techniques aim to obtain a function $f$, which determines whether a point (x) lies on a surface represented by the scattered data points. For example, a function $f(x)$ may be defined so as to yield a value of 1 ($f(x)=1$) if x lies on the surface and $f(x) \neq 1$, if x does not lie on the surface.

In one embodiment, a hierarchical decomposition technique may be applied and the downsampled images in the image pyramid may be used to construct a coarse-to-fine hierarchy of point sets, which may then be interpolated starting from the coarsest level. Accordingly, a point set of the hierarchy may be interpolated by offsetting the interpolating function computed at the previous level. In some embodiments, interpolation may use compactly supported basis functions. For example, in one embodiment, interpolation may use compactly supported Radial Basis Functions (RBFs).

RBFs are real-valued functions whose values depend only on the distance from a point termed a "center". For example, in an N-dimensional Euclidean space, N>0, with m distinct points $x_i$, $1 \leq i \leq m$, an approximation for a function y(x) may be represented as a sum of N radial basis functions, each associated with a different center $x_i$, and weighted by an appropriate coefficient $w_i$. For compactly supported RBFs, $f(x) \neq 0$, in a surrounding of limited extent around the "center."

In step 325, in some embodiments, a plurality of views, such as textured views S1, S2, and S3 may be obtained by projective texture mapping of keyframes onto a proxy geometry based on the current camera pose. The term "proxy geometry" is used to refer to approximate geometric information pertaining to a scene. In projective texture mapping, a camera pose, and a virtual image plane with a texture is cast onto a geometric model using the camera pose as the center of projection.

In some embodiments, the mesh obtained in step 320 may be rendered based on the current viewpoint or current camera pose obtained in step 310 and View Dependent Texture Mapping (VDTM) may be applied by using SLAM keyframes as textures. The mesh thereby becomes a proxy geometry in an image based rendering approach.

VDTM is a technique for generating new views of a scene with approximately known geometry from a sparse set of previously captured images. In VDTM this interpolation is performed using a geometric model to determine pixels in each input image that correspond to a desired ray in the output image. The corresponding rays that are angularly proximate and/or relatively closer in angle to the desired ray are weighted to make the greatest contribution to the interpolated result.

In one embodiment, a plurality of keyframes whose associated camera poses are relatively close in angular displacement, or which are angularly proximate to the current viewpoint, may be determined and a subset of the plurality of keyframes may be used to produce synthetic renderings. For example, three keyframes whose associated camera poses are closest in angular space to the current camera pose or viewpoint may be determined and the three keyframes may be used to produce three synthetic renderings S1, S2, and S3.

In some embodiments, Unstructured Lumigraph Rendering (ULR) techniques may be used to select a subset of keyframes from a plurality of keyframes and produce corresponding renderings. ULR is a real-time rendering technique that is capable of rendering views by using an unstructured collection of input images, camera pose estimates associated with each of the input images, and an approximate geometric proxy for the scene.

For example, ULR may be used to select three keyframes and produce three synthetic renderings S1, S2, and S3, each corresponding to one of the selected keyframes. For example, a "blending field" may be evaluated at a set of vertices in the image plane for the current viewpoint and the blending field may be interpolated over the whole image. The blending field describes how each source keyframe image is weighted when reconstructing a given pixel. The weight may be based, in part, on a variety of factors, including, for example, the angular difference between the current viewpoint and the viewpoints of the keyframe images.

In step 328, the live and synthetic images may be compared and one or more of the known tracked objects may be removed from the live image. For example, synthetic images S1, S2, and S3 obtained in step 325 may be compared with one or more live input image frames 305.

Next, in step 330, a binary image of the known object(s) may be rendered into a mask M that marks the pixels in the live image that are to be replaced. In some embodiments, the mask M may be grown by some amount to yield a mask M'. For example, the mask M may be grown to M' by including pixels in a region around M in order to accommodate tracking and modeling errors. In some embodiments, the mask may be grown by applying a filter operation to the image.

For example, in one embodiment, the filter may determine the silhouette of M and then apply a disc-shaped kernel or a 2D Gaussian kernel to every silhouette pixel. Kernels, which are used in image convolutions, may be represented as a matrix of numbers and are defined for a region around a pixel. The filter operation obtains an output value for each input pixel in M by convolving the values in the matrix with the values of corresponding pixels in the kernel. The results under convolution are dependent upon magnitude and distribution of numbers in the matrix and determine the contribution of each pixel within the kernel to the output pixel.

In another embodiment, the filter may be based on computing a distance transform to M, and then applying a threshold to the distance transform. Such a filter may give a value in the range 0-1, which could be interpreted as an alpha mask for blending real images and synthetic images.

Figure 3B:
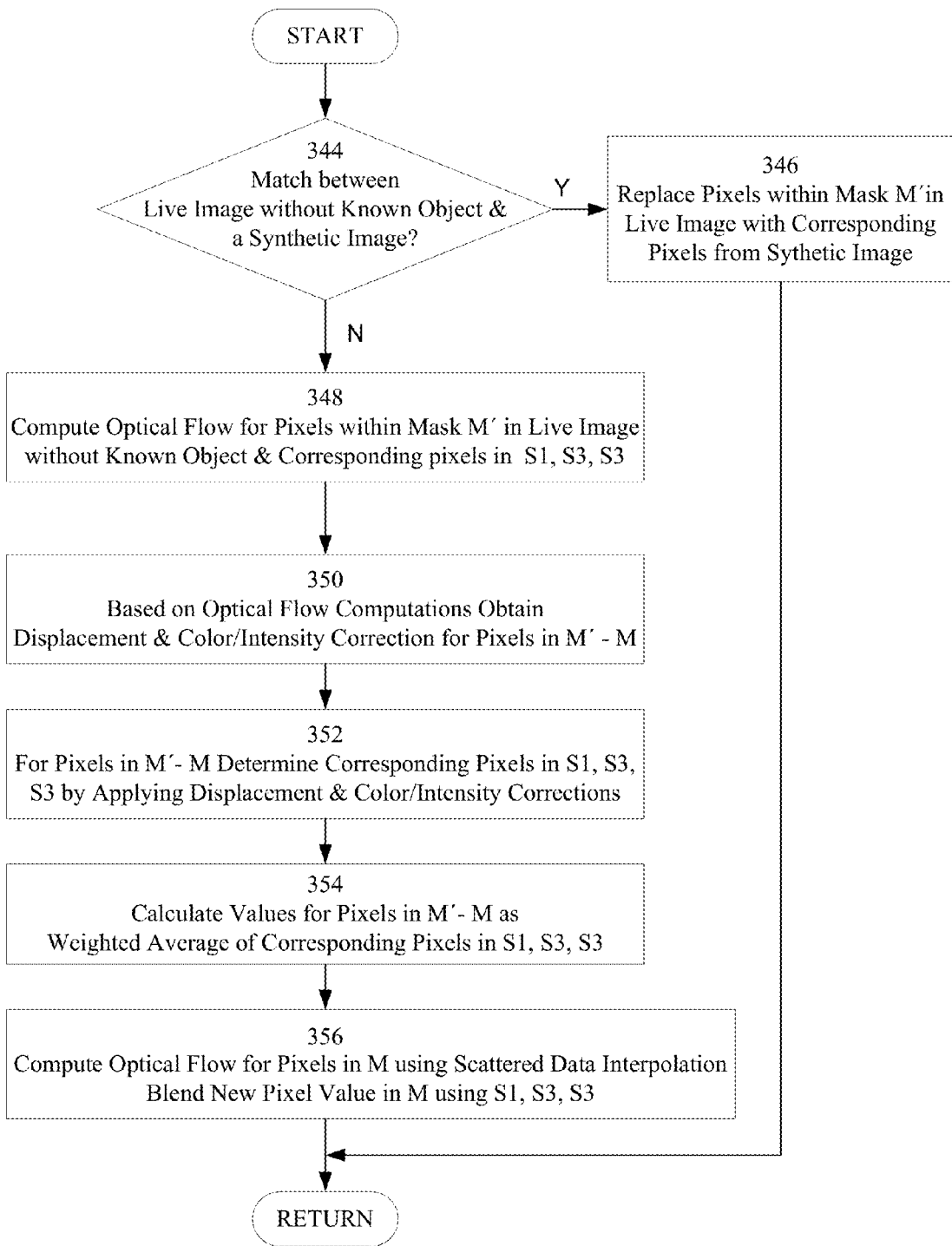
FIG. 3B shows a flowchart for exemplary subroutine to compute replacement pixels for a mask associated with at least one tracked object to facilitate MR effects from reconstruction in a manner consistent with disclosed embodiments.

In subroutine 335, replacement pixels for pixels within M' may then be computed as described in FIG. 3B. In some embodiments, the computed replacement pixels may be used to render Diminished Reality Image 340. The method then begins another iteration by processing the next input video image frame 305. In some embodiments, method 300 may help reduce or eliminate bleeding, ghosting or other artifacts due to tracking or other errors in the rendered image.

For example, the consideration of a small number of pixels near the boundary of a mask around a foreground object may ensure continuity across the mask boundary. For example, in situations where pixels from the live image are adjacent to pixels from the synthetic image, any errors (e.g. from tracking) may be corrected by the result of the optical flow computation.

As described earlier, conventional techniques may also often result in filled-in portions of DR images that may not appear authentic. For example, the DR background using conventional techniques may differ from the actual background behind the removed object. These inaccuracies and inconsistencies may be especially noticeable when the background is complex or non-uniform. When using conventional techniques, information from a non-uniform background used for inpainting appears inconsistent because visual structures may be copied to locations where they do not fit. In contrast, based, in part, on the use of an image based model of the background scene, disclosed embodiments use actual information at accurate background locations to fill in pixels occluded by the foreground object being removed. Therefore, disclosed embodiments are relatively free from such artifacts.

In some embodiments, such as for a mediated reality application, where an real object is replace by a virtual one, method 300 may be modified to additionally render the desired virtual object in the area where the real object was removed. In some embodiments, method 300 may be applied to one or more tracked objects.

In some embodiments, method 300 may also be modified in other ways. For example, in one embodiment, when the 3D model includes the known tracked target, then, a mask corresponding to the object to be removed may be applied to live input video image frame 305 (as in step 330) and steps 315, 320 and 325 pertaining to the reconstruction may be modified to consider pixels that are not masked out.

In some embodiments, live input video image frame 305 may be segmented into a foreground object and background scene, which, in some instances, may be achieved by marking of the foreground object. For a diminished reality application, the foreground object may be the object that is to be removed. In one embodiment, known methods such as GrabCut may be used initially to segment the foreground and background. The silhouette of the foreground object may then be tracked in the live input video images frames 305, and may be used to create a mask of the foreground object to be removed. Steps 315, 320 and 325 pertaining to the reconstruction may be modified to consider pixels that are not masked out.

In some embodiments, method 300 may be used for marker removal. For example, if a user interacts with the scene using fiducial markers (e.g. black-on-white fiducial markers), these markers may be virtually removed.

FIG. 3B shows a flowchart for exemplary subroutine 335 to compute replacement pixels for a mask associated with at least one tracked object to facilitate MR effects from reconstruction in a manner consistent with disclosed embodiments.

In step 344, if any of the synthetic images matches the live image minus (or without) the known/tracked object(s) either exactly or within some predefined threshold measure ("Y" in step 344), then, in step 346, all pixels within the mask in the live image may be replaced with pixels from the synthetic image. In step 344, in the event that there is either no match between the live image minus the known object(s) and any of the synthetic images, or the degree of mismatch exceeds the predefined threshold measure ("N" in step 344), then, the method proceeds to step 348.

In step 348, the relationship between the real and synthetic image pixels within the mask M' may be computed using optical flow methods. Optical flow refers to the apparent motion of intensity patterns in image sequences. Each moving point on a 3D surface, when projected onto the image plane produces a two-dimensional (2D) path. The term "2D motion field" is used to refer to the 2D velocities for all visible surface points. Optical flow estimation may be used compute an approximation to the 2D motion field based on the time-varying image intensity.

In some embodiments, the optical flow computation may be limited to the area covered by the mask M'. For example, in one embodiment, optical flow computation may be performed for every pixel within mask M' in live input video image frame 305 to synthetic images S1, S2 and S3.

In step 350, a displacement and a color/intensity correction for every pixel within M'-M may be determined based on the optical flow computation, so that pixels from the synthetic images can be made to match the portions of the live image outside the mask M and within mask M'.

In step 352, for pixels within M'-M, three corresponding pixels, one each from S1, S2 and S3 may be determined based on the optical flow correction determined in step 350.

Next, in step 354, in some embodiments, the value of every pixel within M'-M may be computed as a weighted average of the three corresponding pixels, one each from S1, S2 and S3. In some embodiments, the weight for a pixel may be a function of the magnitude of the optical flow for that pixel and of the angular displacement between live input video image frame 305 and S1, S2, S3, respectively.

In some embodiments, the optical flow computation in M'-M may be constrained to an affine motion, thereby limiting the number of unknowns estimated. For affine motion, there are six unknowns. For small areas, affine transformations can provide accurate approximations of the image motion of a smooth surface.

In some embodiments, in step 356, the optical flow for a pixel within mask M may be computed by scattered data interpolation from the boundary M'-M. The values for pixels in M may be computed as a weighted average of the three corresponding pixels, one each from S1, S2 and S3 using the interpolated optical flow values. Further, pixel values within M may be obtained by blending pixels from S1, S2, and S3 based on the optical flow.

In some embodiments, where alpha (transparency) values are computed for pixels in M as part of computing M', then the alpha value for a pixel may be used to blend the new computed value for the pixel with the original value of the corresponding pixel in live input video image frame 305. In some embodiments, routine 335 may be modified (i) to omit step 354, and (ii) by modifying step 356 so that new values may be computed for every pixel in M'.

In some embodiments, such as for a mediated reality application, where an real object may replaced by a virtual one, routine 335 may be modified to additionally render the desired virtual object in the area where the real object was removed based on parameters received from the calling program.

In some embodiments, methods 300 and/or 335 may be used to remove unknown or unexpected objects from a known scene. In one embodiment, the removal of an unknown object present in a previously reconstructed scene may be performed by joint estimation of optical flow and segmentation. For example, routine 335 may be modified to include a step that compares the entire synthetic and live images and determine regions that do not match. Any of these regions can then be removed using the techniques described previously. For example, if a user's hands or fingers are inadvertently in an image frame, then these may be removed from the scene.

In a further embodiment, methods 300 and/or 335 may be used with appropriate modifications to deliver precise occlusion between virtual and real objects. For example, if a known (tracked or stationary) object is present in live input video image frame 305 and the tracked object may occlude virtual objects, then a phantom or virtual representation of the real known object may be rendered in a virtual z-buffer. The resulting phantom z-buffer may be used to resolve occlusions with the virtual object.

To account for tracking errors, the optical flow between the phantom z-buffer image and the corresponding image of the real object in the live video may be computed and used to warp the phantom z-buffer image to match the live video.

Accordingly, in some embodiments, step 330 may be modified to render a mask M", which is not grown further, corresponding to the footprint of the virtual object. In some embodiments, routine 335 may then be modified to compute the optical flow between the virtual representation M" and the corresponding image of the real object in the live video to warp the virtual z-buffer to match the live video.

For every pixel of the virtual object, a depth test from the warped virtual z-buffer may be used to determine whether that pixel is drawn or not. For example, occlusion may be used where real objects occlude virtual objects such as during a game where virtual characters may hide behind real objects. Note that, in the embodiment described above, no objects are removed. Instead, a depth test from the warped z-buffer for every pixel of the new virtual object determines whether that pixel is drawn or not.

In some embodiments, portions of method 300 may be performed by some combination of MS 100, and one or more servers or other computers wirelessly coupled to MS 100 through transceiver 170. For example, MS may send data to a server and one or more steps in method 300 may be performed by a server and the results may be returned to MS 100.

Figure 4:
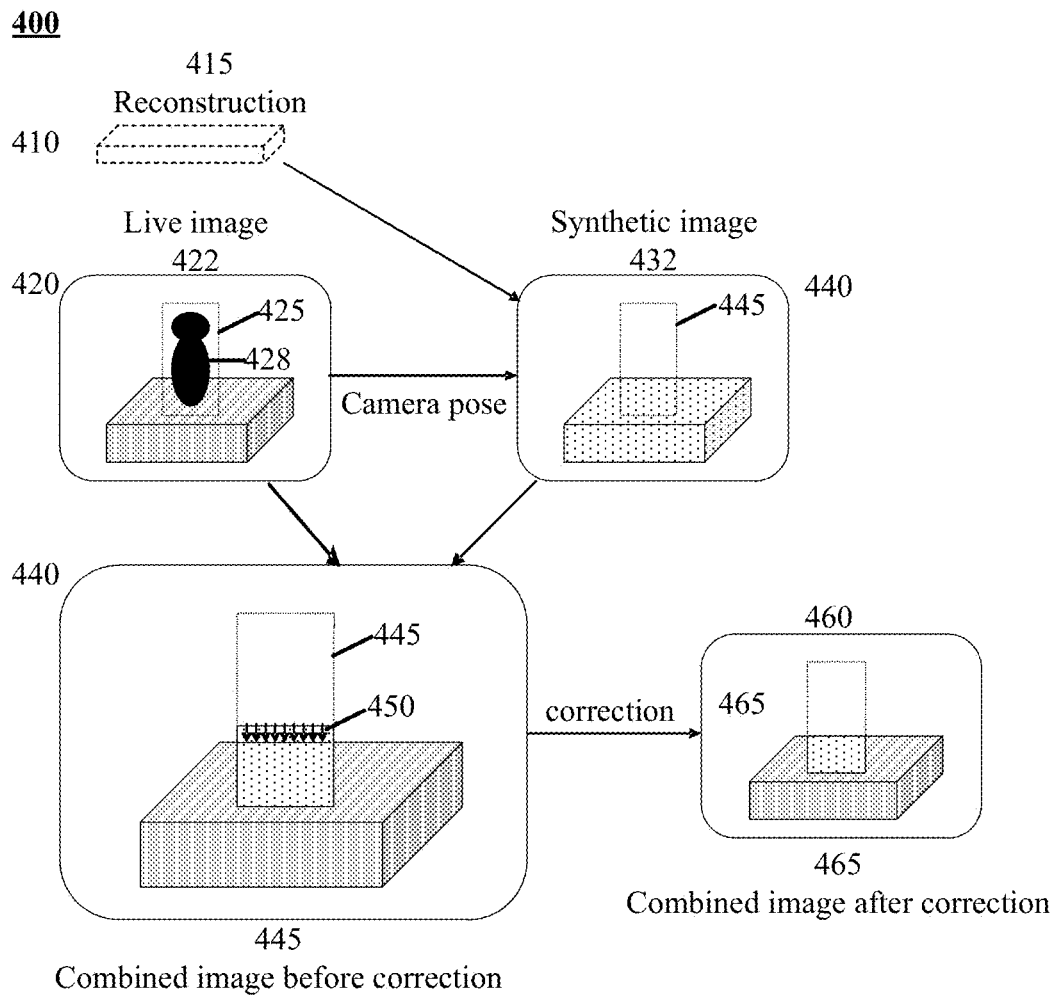
FIG. 4 illustrates an exemplary workflow for an exemplary diminished reality application and for a single synthetic image.

FIG. 4 illustrates an exemplary workflow 400 for an exemplary diminished reality application and for a single synthetic image. In FIG. 4, in step 410, for example, a reconstructed scene 415 may be obtained from a 3D model corresponding to the environment. In some embodiments, reconstructed scene 415 may not include foreground object 428.

In step 420, a foreground object 428 may be identified for removal and mask 425 may be created. In some embodiments, in step 420, a camera pose may be determined from live image 422.

In step 430, synthetic image 432 based on the camera pose determined in step 420 is rendered using reconstructed scene 415. As shown in FIG. 4, synthetic image 432 does not include object 425 in region 435 that corresponds to the mask 425.

In step 440, synthetic image 432 may be combined with live image 422 and pixels associated with mask 425 may be replaced by corresponding pixels in region 435. In some embodiments, mask 445 (which may correspond to M') shown in step 440 may be larger than mask 425 (which may correspond to M). As shown in FIG. 4, prior to correction, there may be bleed, ghosting or other artifacts 450 in combined image 345 due to tracking or other errors.

In step 460, corrections may be applied to the combined image 345 by computing the optical flow between the live image 422 and synthetic image 432 (and one or more additional synthetic images) may be computed. For example, in one embodiment, the optical flow computation may be limited to the area covered by the mask 445. For example, in one embodiment, optical flow computation may be performed for every pixel within mask 445 to one or more synthetic images. Optical flow computations may yield a displacement and a color/intensity correction so that pixels from the synthetic images can be made to match pixels in the live image in the mask M. The corrections may be applied to obtain combined image after correction 465.

Figure 5:
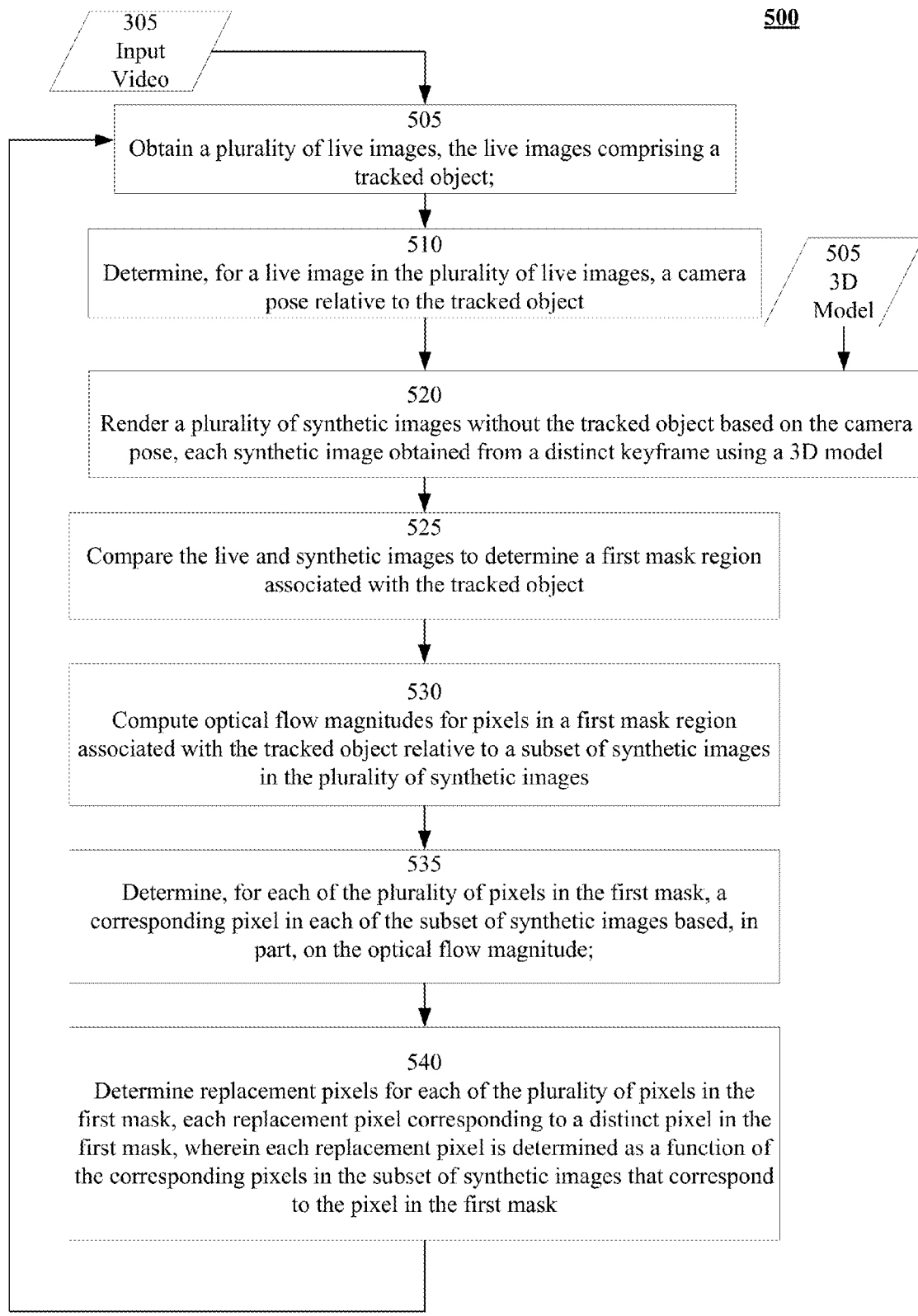
FIG. 5 shows a flowchart for an exemplary method for facilitating MR effects such as diminished and mediated reality effects from reconstruction in a manner consistent with disclosed embodiments.

FIG. 5 shows a flowchart 500 for an exemplary method for facilitating MR effects such as diminished and mediated reality effects from reconstruction in a manner consistent with disclosed embodiments. In some embodiments, method 500 may be performed by MS 100. In some embodiments, as part of an initialization process, a first image frame may be segmented into a foreground, which comprises a tracked object and background. For example, a 3D model without the tracked object, or methods such as GrabCut, or other segmentation techniques may be used.

In step 505, the first or next live input video image frame 305 in a plurality of live image frames comprising a tracked object may be obtained. Next, in step 510, live image 305 may be processed to determine, for a live image in the plurality of live images, a camera pose relative to the tracked object. In some embodiments, SLAM tracking techniques may be used to determine a camera pose for the live input video image frame 305 comprising the tracked object. In general, any real-time tracking technique may be used to track the object across live image frames 305.

In step 520, the camera pose may be used to render a plurality of synthetic images without the tracked object, where each synthetic image may be obtained from a distinct keyframe in 3D model 505. For example, three synthetic images without the tracked object that are closest in angular proximity, based on the camera pose, to the current live image frame may be rendered. In some embodiments, the distinct keyframes may be selected based on their angular displacement proximity of the distinct keyframes relative to the camera pose. In some embodiments, the 3D model may not include the tracked object.

In some embodiments, the 3D model may be generated offline. In some embodiments, the 3D model may be obtained using VSLAM techniques. For example, VSLAM techniques may be used to acquire the keyframes and create a sparse point cloud representation of an environment. In some embodiments, a textured 3D mesh may be obtained from the sparse cloud representation.

In step 525, the live and synthetic images may be compared to determine a first mask region associated with the tracked object. Next, in step 530, optical flow magnitudes for pixels in a first mask region associated with the tracked object relative to a subset of synthetic images in the plurality of synthetic images may be computed.

In step 530, for each of the plurality of pixels in the first mask, a corresponding pixel in each of the subset of synthetic images may be determined based, in part, on the optical flow magnitude. In the example above, a synthetic image pixel corresponding to a pixel in the first mask may be determined in each of the three synthetic images. For example, based on the optical flow, a displacement and color and/or intensity correction for each of the plurality of pixels in the first mask may be obtained. The displacement and color/intensity correction for pixels inside the mask may be used to determine corresponding pixels from the synthetic images, which match portions of the live image within the first mask.

In step 540, replacement pixels for each of the plurality of pixels in the first mask may be determined, where each replacement pixel may correspond to a distinct pixel in the first mask, and where each replacement pixel may be determined as a function of pixels in the subset of synthetic images that correspond to the pixel corresponding to the replacement pixel in the first mask. In some embodiments, each replacement pixel may be determined as a weighted average of corresponding pixels in the subset of synthetic images, wherein the weight associated with a corresponding pixel in a synthetic image in the subset, is based, in part, on the optical flow magnitude for the corresponding pixel, and the angular displacement between the live image and the synthetic image associated with the corresponding pixel. In some embodiments, the first mask (M') region may comprise a second mask region (M) around the tracked object and the optical flow magnitude for each replacement pixel in M may be determined by scattered data interpolation from the boundary M'-M.

In some embodiments, a diminished reality image may then be rendered, where the diminished reality image may be obtained based, at least in part, on the replacement pixels. In some embodiments, a virtual object may also be rendered in a region in the image indicated by the first mask, where the virtual object is rendered based on the current camera pose. In some embodiments, the virtual object may be rendered in the region in the image indicated by first mask by: rendering a virtual representation of at least one known real object in the image, into a virtual z buffer, where the real object is at least partially in the first mask; resolving occlusions between the at least one known real object and the virtual object in the virtual z-buffer; and warping the virtual z-buffer to match the image, the warping based, in part, on an optical flow between the virtual representation of the at least one known real object and the at least one real object in the image.

In some embodiments, computing the optical flow magnitudes for pixels in the first mask (M') associated with the tracked object may comprise rendering the pixels of the tracked object in the image into a second mask (M), where the second mask indicating a region in the image comprising pixels to be replaced. In addition, optical flow magnitudes for pixels in the region between the first and second masks (M'-M) in the image may be computed relative to the subset of synthetic images. Further, optical flow magnitudes for pixels in the second mask (M) may be computed using scattered data interpolation. The process may then return to step 510 to begin the next iteration.

In some embodiments, a diminished reality image may be rendered based, in part, on the replacement pixels. Further, method 500 may be modified in various ways. For example, in mixed reality applications, a virtual object may be rendered in the region indicated by the replacement pixels. In some embodiments, rendering the virtual object in the region indicated by the replacement pixels may comprise, rendering a virtual representation of a known/tracked real object in the image into a virtual z-buffer, which may be used to resolve occlusions between the known real object and the virtual object. Further, the virtual z-buffer may be warped to match the image, the warping may be based on an optical flow between the virtual representation of the at least one known real object and the at least one real object in the image.

Figure 6:
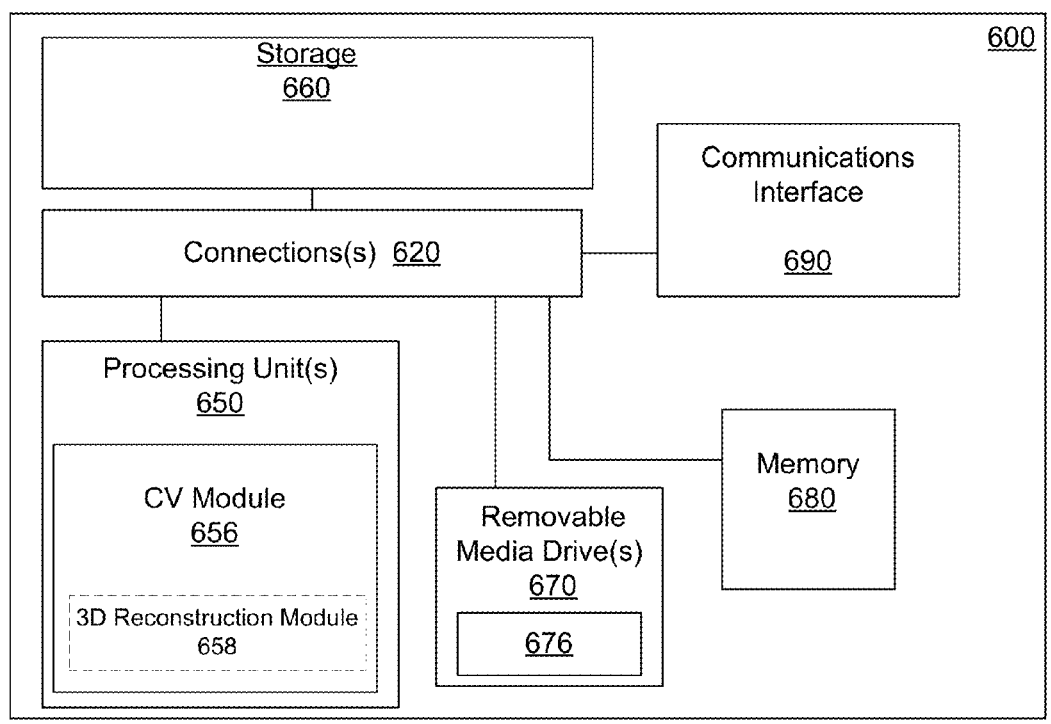
FIG. 6 shows a schematic block diagram illustrating a server 600 enabled to facilitate diminished and mediated reality effects in a manner consistent with disclosed embodiments.

Reference is now made to FIG. 6, which is a schematic block diagram illustrating a server 600 enabled to facilitate diminished and mediated reality effects in a manner consistent with disclosed embodiments. In some embodiments, server 600 may perform portions of the methods 300, 335 and/or 500. In some embodiments, methods 300, 335 and/or 500 may be performed by processing units 650 and/or Computer Vision (CV) module 656. For example, the above methods may be performed in whole or in part by processing units 650 and/or CV module 656 in conjunction with one or more functional units on server 600 and/or in conjunction with MS 100.

In some embodiments, server 600 may be wirelessly coupled to one or more mobile stations 100 over a wireless network (not shown), which may one of a WWAN, WLAN or WPAN. In some embodiments, server 600 may include, for example, one or more processing units 650, memory 680, storage 660, and (as applicable) communications interface 690 (e.g., wireline or wireless network interface), which may be operatively coupled with one or more connections 620 (e.g., buses, lines, fibers, links, etc.). In certain example implementations, some portion of server 600 may take the form of a chipset, and/or the like.

Communications interface 690 may include a variety of wired and wireless connections that support wired transmission and/or reception and, if desired, may additionally or alternatively support transmission and reception of one or more signals over one or more types of wireless communication networks. Communications interface 690 may include interfaces for communication with MS 100 and/or various other computers and peripherals. For example, in one embodiment, communications interface 690 may comprise network interface cards, input-output cards, chips and/or ASICs that implement one or more of the communication functions performed by server 600. In some embodiments, communications interface 690 may also interface with MS 100 to send 3D model information for an environment, and/or receive data and/or instructions related to methods 300 and/or 500.

Processing units 650 may use some or all of the received information to perform the requested computations and/or to send the requested information and/or results to MS 100 via communications interface 690. In some embodiments, processing units 650 may be implemented using a combination of hardware, firmware, and software. In some embodiments, processing unit 650 may include Computer Vision (CV) Module 656, which may implement and execute computer vision methods, including AR/MR procedures, SLAM map generation, etc. In some embodiments, CV module 656 may comprise 3D reconstruction module 658, which may perform 3D reconstruction and/or provide/update 3D models of the environment. In some embodiments, processing unit 650 may represent one or more circuits configurable to perform at least a portion of a data signal computing procedure or process related to the operation of server 600.

The methodologies described herein in flow charts and message flows may be implemented by various means depending upon the application. For example, these methodologies may be implemented in hardware, firmware, software, or any combination thereof. For a hardware implementation, the processing unit 650 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software may be stored in removable media drive 670, which may support the use of non-transitory computer-readable media 676, including removable media. Program code may be resident on non-transitory computer readable media 676 or memory 680 and may be read and executed by processing units 650. Memory may be implemented within processing units 650 or external to the processing units 650. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium 676 and/or memory 680. Examples include computer-readable media encoded with a data structure and computer-readable media encoded with a computer program. For example, non transitory computer-readable medium 676 including program code stored thereon may include program code to facilitate MR effects such as diminished and mediated reality effects from reconstruction in a manner consistent with disclosed embodiments.

Non-transitory computer-readable media may include a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interface 690, which may store the instructions/data in memory 680, storage 660 and/or relayed the instructions/data to processing units 650 for execution. For example, communications interface 690 may receive wireless or network signals indicative of instructions and data. The instructions and data are configured to cause one or more processors to implement the functions outlined in the claims. That is, the communication apparatus includes transmission media with signals indicative of information to perform disclosed functions.

Memory 680 may represent any data storage mechanism. Memory 680 may include, for example, a primary memory and/or a secondary memory. Primary memory may include, for example, a random access memory, read only memory, nonvolatile RAM, etc. While illustrated in this example as being separate from processing unit 650, it should be understood that all or part of a primary memory may be provided within or otherwise co-located/coupled with processing unit 650. Secondary memory may include, for example, the same or similar type of memory as primary memory and/or storage 660 such as one or more data storage devices 660 including, for example, hard disk drives, optical disc drives, tape drives, a solid state memory drive, etc.

In some embodiments, storage 660 may comprise one or more databases that may hold information pertaining to an environment, including 3D models, keyframes, information pertaining to virtual objects, etc. In some embodiments, information in the databases may be read, used and/or updated by processing units 650 during various computations.

In certain implementations, secondary memory may be operatively receptive of, or otherwise configurable to couple to a non-transitory computer-readable medium 676. As such, in certain example implementations, the methods and/or apparatuses presented herein may be implemented in whole or in part using non-transitory computer readable medium 676 that may include with computer implementable instructions stored thereon, which if executed by at least one processing unit 650 may be operatively enabled to perform all or portions of the example operations as described herein. In some embodiments, computer readable medium 676 may be read using removable media drive 670 and/or may form part of memory 680.

Embodiments disclosed herein facilitate leveraging of the infrastructure of a SLAM system as a foundation for computationally efficient mixed reality applications, such as object removal or replacement. In some embodiments, MR efficiency and/or performance may be obtained by considering a small number of pixels near the boundary of a mask around a foreground object, which is enough to ensure continuity across the mask boundary, where pixels from the live image are adjacent to pixels from the synthetic image, corrected by the result of the optical flow computation. The methodologies described herein may be implemented by various means depending upon the application. For example, for a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software code may be stored in a memory and executed by a processor unit. In some embodiments, the functions may be stored as one or more instructions or code on a computer-readable medium. Examples include computer-readable media encoded with a data structure and computer-readable media encoded with a computer program. Computer-readable media includes physical computer storage media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A processor-implemented method comprising:
 obtaining a plurality of live images, the plurality of live images comprising a tracked object;
 determining, for a live image in the plurality of live images, a camera pose relative to the tracked object, wherein the camera pose is determined using Simultaneous Localization and Mapping (SLAM) based techniques;

rendering, based on the camera pose, a plurality of synthetic images without the tracked object, each synthetic image obtained from a distinct keyframe in a 3D model;

comparing the live image and at least one of the plurality of synthetic images to determine a first mask region associated with the tracked object;

computing optical flow magnitudes for a plurality of pixels in the first mask region associated with the tracked object relative to a subset of synthetic images in the plurality of synthetic images;

determining, for each of the plurality of pixels in a first mask corresponding to the first mask region, a corresponding pixel in each synthetic image of the subset of synthetic images based, in part, on the optical flow magnitude; and determining replacement pixels for the plurality of pixels in the first mask, each replacement pixel corresponding to a distinct pixel in the first mask, wherein each replacement pixel is determined as a function of the corresponding pixels in the subset of synthetic images that correspond to the pixel in the first mask.

2. The method of claim 1, further comprising rendering a diminished reality image, the diminished reality image obtained based, at least in part, on the replacement pixels.

3. The method of claim 2, further comprising:
rendering a virtual object in the first mask region, the virtual object being rendered based on the current camera pose.

4. The method of claim 3, wherein rendering the virtual object in the first mask region comprises:
rendering a virtual representation of at least one known real object in the live image, into a virtual z-buffer, the real object at least partially in the first mask;
resolving occlusions between the at least one known real object and the virtual object in the virtual z-buffer; and
warping the virtual z-buffer to match the image, the warping based, in part, on an optical flow between the virtual representation of the at least one known real object and the at least one real object in the image.

5. The method of claim 1, wherein determining the corresponding pixel in each synthetic image of the subset of synthetic images comprises:
obtaining, for each of the plurality of pixels in the first mask, a displacement correction and an intensity correction based, in part, on the optical flow magnitude.

6. The method of claim 1, wherein:
each replacement pixel is determined as a weighted average of corresponding pixels in the subset of synthetic images, wherein a weight associated with a corresponding pixel in a synthetic image in the subset of synthetic images, is based, in part, on the optical flow magnitude for the corresponding pixel, and an angular displacement between the live image and the synthetic image associated with the corresponding pixel.

7. The method of claim 6, wherein the first mask (M') region comprises a second mask region (M) around the tracked object and wherein the optical flow magnitude for each replacement pixel in M is determined by scattered data interpolation from a boundary of M'-M.

8. The method of claim 1, wherein the plurality of synthetic images and the subset of the plurality of synthetic images each comprise three synthetic images.

9. A Mobile Station (MS) comprising:
a camera configured to capture a plurality of live images comprising a tracked object,
a memory, the memory to store a 3D model comprising a plurality of keyframes, and a processor coupled to the camera and the memory, wherein the processor is configured to:
determine, for a live image in the plurality of live images, a camera pose relative to the tracked object, wherein the camera pose is determined using Simultaneous Localization and Mapping (SLAM) based techniques;
render, based on the camera pose, a plurality of synthetic images without the tracked object, each synthetic image obtained from a distinct keyframe;
compare the live image and at least one of the plurality of synthetic images to determine a first mask region associated with the tracked object;
compute optical flow magnitudes for a plurality of pixels in the first mask region associated with the tracked object relative to a subset of synthetic images in the plurality of synthetic images;
determine, for each of the plurality of pixels in a first mask corresponding to the first mask region, a corresponding pixel in each synthetic image of the subset of synthetic images based, in part, on the optical flow magnitude; and
determine replacement pixels for the plurality of pixels in the first mask, each replacement pixel corresponding to a distinct pixel in the first mask, wherein each replacement pixel is determined as a function of the corresponding pixels in the subset of synthetic images that correspond to the pixel in the first mask.

10. The MS of claim 9, wherein the processor is further configured to:
render a diminished reality image, the diminished reality image obtained based, at least in part, on the replacement pixels.

11. The MS of claim 10, wherein the processor is further configured to:
render a virtual object in the first mask region, the virtual object being rendered based on the current camera pose.

12. The MS of claim 11, wherein to render the virtual object in the first mask region, the processor is configured to:
render a virtual representation of at least one known real object in the live image, into a virtual z-buffer, the real object at least partially in the first mask;
resolve occlusions between the at least one known real object and the virtual object in the virtual z-buffer; and
warp the virtual z-buffer to match the image, the warping based, in part, on an optical flow between the virtual representation of the at least one known real object and the at least one real object in the image.

13. The MS of claim 9, wherein to determine the corresponding pixel in each synthetic image of the subset of synthetic images, the processor is configured to:
obtain, for each of the plurality of pixels in the first mask, a displacement correction and an intensity correction based, in part, on the optical flow magnitude.

14. The MS of claim 9, wherein:
each replacement pixel is determined as a weighted average of corresponding pixels in the subset of synthetic images, wherein a weight associated with a corresponding pixel in a synthetic image in the subset of synthetic images, is based, in part, on the optical flow magnitude for the corresponding pixel, and an angular displacement between the live image and the synthetic image associated with the corresponding pixel.

15. The MS of claim 14, wherein:
the first mask (M') region comprises a second mask region (M) around the tracked object and wherein the optical flow magnitude for each replacement pixel in M is determined by scattered data interpolation from a boundary of M'-M.

16. The MS of claim 9, wherein the plurality of synthetic images and the subset of the plurality of synthetic images each comprise three synthetic images.

17. An apparatus comprising:
imaging means, the imaging means to capture a plurality of live images comprising a tracked object,
storage means, the storage means to store a 3D model comprising a plurality of keyframes, and
processing means, the processing means coupled to the imaging means and the storage means, the processing means further comprising:
means for determining, for a live image in the plurality of live images, an imaging means pose relative to the tracked object, wherein the imaging means pose is determined using Simultaneous Localization and Mapping (SLAM) based techniques;
means for rendering, based on the imaging means pose, a plurality of synthetic images without the tracked object, each synthetic image obtained from a distinct keyframe;
means for comparing the live image and at least one of the plurality of synthetic images to determine a first mask region associated with the tracked object;
means for computing optical flow magnitudes for a plurality of pixels in the first mask region associated with the tracked object relative to a subset of synthetic images in the plurality of synthetic images;
means for determining, for each of the plurality of pixels in a first mask corresponding to the first mask region, a corresponding pixel in each synthetic image of the subset of synthetic images based, in part, on the optical flow magnitude; and
means for determining replacement pixels of the plurality of pixels in the first mask, each replacement pixel corresponding to a distinct pixel in the first mask, wherein each replacement pixel is determined as a function of the corresponding pixels in the subset of synthetic images that correspond to the pixel in the first mask.

18. The apparatus of claim 17, wherein the processing means further comprises:
means for rendering a diminished reality image, the diminished reality image obtained based, at least in part, on the replacement pixels.

19. The apparatus of claim 18, wherein the processing means further comprises:
means for rendering a virtual object in the first mask region, the virtual object being rendered based on the current imaging means pose.

20. The apparatus of claim 19, wherein means for rendering the virtual object in the first mask region comprises:
means for rendering a virtual representation of at least one known real object in the live image, into a virtual z-buffer, the real object at least partially in the first mask;
means for resolving occlusions between the at least one known real object and the virtual object in the virtual z-buffer; and
means for warping the virtual z-buffer to match the image, the warping based, in part, on an optical flow between the virtual representation of the at least one known real object and the at least one real object in the image.

21. The apparatus of claim 17, wherein:
each replacement pixel is determined as a weighted average of corresponding pixels in the subset of synthetic images, wherein a weight associated with a corresponding pixel in a synthetic image in the subset of synthetic images, is based, in part, on the optical flow magnitude for the corresponding pixel, and an angular displacement between the live image and the synthetic image associated with the corresponding pixel.

22. A non-transitory computer-readable medium comprising instructions, which, when executed by a processor, perform steps in a method comprising:
obtaining a plurality of live images, the live images comprising a tracked object;
determining, for a live image in the plurality of live images, a camera pose relative to the tracked object, wherein the camera pose is determined using Simultaneous Localization and Mapping (SLAM) based techniques;
rendering, based on the camera pose, a plurality of synthetic images without the tracked object, each synthetic image obtained from a distinct keyframe in a 3D model based on the camera pose;
comparing the live image and at least one of the plurality of synthetic images to determine a first mask region associated with the tracked object;
computing optical flow magnitudes for a plurality of pixels in the first mask region associated with the tracked object relative to a subset of synthetic images in the plurality of synthetic images;
determining, for each of the plurality of pixels in a first mask corresponding to the first mask region, a corresponding pixel in each synthetic image of the subset of synthetic images based, in part, on the optical flow magnitude; and
determining replacement pixels of the plurality of pixels in the first mask, each replacement pixel corresponding to a distinct pixel in the first mask, wherein each replacement pixel is determined as a function of the corresponding pixels in the subset of synthetic images that correspond to the pixel in the first mask.

23. The computer-readable medium of claim 22, further comprising rendering a diminished reality image, the diminished reality image obtained based, at least in part, on the replacement pixels.

24. The computer-readable medium of claim 23, further comprising, rendering a virtual object in the first mask region, the virtual object being rendered based on the current camera pose.

25. The computer-readable medium of claim 24, wherein rendering the virtual object in the first mask region comprises:
rendering a virtual representation of at least one known real object in the image, into a virtual z-buffer, the real object at least partially in the first mask;
resolving occlusions between the at least one known real object and the virtual object in the virtual z-buffer; and
warping the virtual z-buffer to match the image, the warping based, in part, on an optical flow between the virtual representation of the at least one known real object and the at least one real object in the image.

26. The computer-readable medium of claim 22, wherein determining the corresponding pixel in each synthetic image of the subset of synthetic images comprises:
obtaining, for each of the plurality of pixels in the first mask, a displacement correction and an intensity correction based, in part, on the optical flow magnitude.

27. The computer-readable medium of claim 22, wherein:
each replacement pixel is determined as a weighted average of corresponding pixels in the subset of synthetic images, wherein a weight associated with a corresponding pixel in a synthetic image in the subset of synthetic images, is based, in part, on the optical flow magnitude for the corresponding pixel, and an angular displacement between the live image and the synthetic image associated with the corresponding pixel.

28. The computer-readable medium of claim 27, wherein the first mask (M') region comprises a second mask region (M) around the tracked object and wherein the optical flow magnitude for each replacement pixel in M is determined by scattered data interpolation from a boundary of M'-M.

* * * * *